(12) United States Patent
Annampedu

(10) Patent No.: US 9,093,096 B2
(45) Date of Patent: Jul. 28, 2015

(54) FLAW SCAN CIRCUIT FOR REPEATABLE RUN OUT (RRO) DATA

(75) Inventor: Viswanath Annampedu, Schnecksville, PA (US)

(73) Assignee: LSI Corporation, San Jose, CA (US)

( * ) Notice: Subject to any disclaimer, the term of this patent is extended or adjusted under 35 U.S.C. 154(b) by 23 days.

(21) Appl. No.: 13/559,744

(22) Filed: Jul. 27, 2012

(65) Prior Publication Data
US 2014/0033000 A1    Jan. 30, 2014

(51) Int. Cl.
*G06F 11/07* (2006.01)
*G11B 5/596* (2006.01)

(52) U.S. Cl.
CPC .................................. *G11B 5/59627* (2013.01)

(58) Field of Classification Search
CPC ............ G06F 11/1076; G06F 11/1008; G06F 2211/1057; G11B 20/1833; G11B 5/59627; H05K 999/99
USPC ................... 714/770, 799, E11.024
See application file for complete search history.

(56) References Cited

U.S. PATENT DOCUMENTS

| | | | | |
|---|---|---|---|---|
| 7,855,851 | B2 * | 12/2010 | Shirai .................. | 360/77.04 |
| 7,872,828 | B1 * | 1/2011 | Sutardja et al. .......... | 360/75 |
| 2005/0231844 | A1 * | 10/2005 | Annampedu et al. ....... | 360/46 |
| 2010/0142078 | A1 * | 6/2010 | Annampedu et al. ....... | 360/51 |

\* cited by examiner

*Primary Examiner* — Albert Decady
*Assistant Examiner* — Kyle Vallecillo
(74) *Attorney, Agent, or Firm* — Hamilton DeSanctis & Cha

(57) ABSTRACT

Improved flaw scan circuits are provided for repeatable run out data. RRO (repeatable run out) data is processed by counting a number of RRO data bits detected in a servo sector; and setting an RRO flaw flag if at least a specified number of RRO data bits is not detected in the server sector. The RRO flaw flag can also optionally be set by detecting an RRO address mark in the servo sector; counting a number of samples in the servo sector after the RRO address mark that do not satisfy a quality threshold; and setting the RRO flaw flag when the counted number of samples that do not satisfy the quality threshold exceeds a specified flaw threshold. If the RRO flaw flag is set, the RRO data can be discarded, and/or an error recovery mechanism can be implemented to obtain the RRO data.

20 Claims, 4 Drawing Sheets

US 9,093,096 B2

FLAW SCAN CIRCUIT FOR REPEATABLE RUN OUT (RRO) DATA

BACKGROUND

A read channel integrated circuit (IC) is one of the core electronic components in a modern hard disk drive. In a magnetic recording system, for example, a read channel converts and encodes data to enable magnetic recording heads to write data to a magnetic medium and to then read back the data accurately. The magnetic media in a magnetic recording system have a number of tracks and each track comprises "read" sectors, with "servo" sectors embedded between the read sectors. The information recorded in the servo sectors helps to position a magnetic recording head so that the user information stored in the read sectors can be retrieved properly.

The servo and read sectors both typically begin with the same known preamble pattern. The read preamble is followed by a read address mark and encoded user data. The servo preamble is followed by a servo address mark and various servo data, including a repeatable run out (RRO) data field that compensates for known errors due to inaccurate spindle centers on the disks. The RRO data field typically comprises an RRO synchronization pattern that is often referred to as an RRO address mark (RROAM), followed by additional RRO data.

When the magnetic hard disk is not spinning exactly at the center, the magnetic recording head will observe an elliptical track rather than a circular track. Flaw scan circuits are typically used to determine the quality of the RRO data that is read from the magnetic media. Existing flaw scan circuits identify low quality samples entering a data detector in a magnetic recording system and set a flag when the number of low quality samples exceeds a specified threshold. The flaw scan circuit will typically begin counting the number of low quality samples after detecting the RRO address mark. When the RRO address mark is missed and a false RRO address mark pattern is later detected due to noise, however, the flaw scan circuit may not properly count the low quality samples. For example, if the false RRO address mark is found towards the end of a servo processing gate, an insufficient number of low quality samples will be captured to set the flag.

A need therefore exists for improved flaw scan circuits for repeatable run out data.

SUMMARY

Illustrative embodiments of the invention provide improved flaw scan circuits for repeatable run out data. According to one embodiment of the invention, RRO (repeatable run out) data is processed by counting a number of RRO data bits detected in a servo sector; and setting an RRO flaw flag if at least a specified number of RRO data bits is not detected in the server sector.

In another embodiment, the RRO flaw flag can also be set by detecting an RRO address mark in the servo sector; counting a number of samples in the servo sector after the RRO address mark that do not satisfy a quality threshold; and setting the RRO flaw flag when the counted number of samples that do not satisfy the quality threshold exceeds a specified flaw threshold.

A more complete understanding of embodiments of the present invention will be obtained by reference to the following detailed description and drawings.

DETAILED DESCRIPTION

Embodiments of the invention will be illustrated herein in conjunction with exemplary magnetic recording devices, controllers and associated read channel techniques. It should be understood, however, that the this and other embodiments of the invention are more generally applicable to any magnetic recording system in which improved flaw scan circuits are desired, and may be implemented using components other than those specifically shown and described in conjunction with embodiments of the invention.

Embodiments of the invention provide improved flaw scan circuits for setting a flaw flag indicating poor quality of the RRO data. The present invention recognizes that the number of expected RRO data bits is known. According to one embodiment of the invention, discussed further below in conjunction with FIG. 7, the disclosed flaw scan system uses the expected number of RRO data bits to set the RRO flaw flag if an expected number of RRO data bits is not recovered by the servo channel, even if the number of low quality samples does not exceed the specified flaw threshold.

Figure 1:
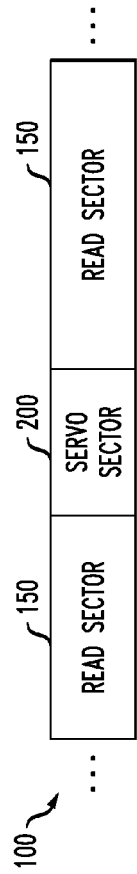
FIG. 1 illustrates a typical track format for recording servo sector information and read sector information on a magnetic medium.

FIG. 1 illustrates a typical track format 100 for recording servo sector information 200, as discussed further below in conjunction with FIG. 2, and read sector information 150 in a disk drive. In an embedded servo system, for example, there are typically approximately around 60 to 100 servo sectors 200 per track that consume about 10% of the surface area. The remaining 90% of the surface area is used for read sectors 150 to store user data information. As shown in FIG. 1, the servo sectors 200 and read sectors 150 typically alternate on a given track, such that each servo sector 200 is typically preceded by a read sector 150 and followed by a read sector 150.

Figure 2:
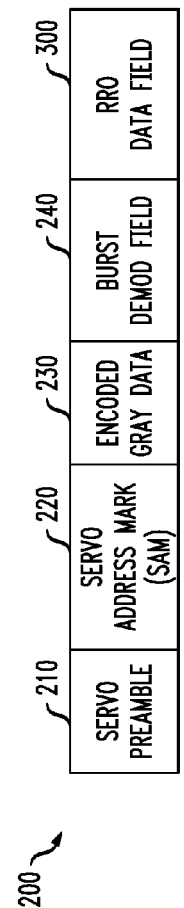
FIG. 2 illustrates a format for the servo sectors of FIG. 1.

FIG. 2 illustrates a format of servo sector information 200. As shown in FIG. 2, the servo sector information 200 comprises a preamble 210, such as a 2T preamble pattern, that allows the recording system to recover the timing and gain of the written servo data. The preamble 210 is typically followed by a servo address mark (SAM) 220 that is generally the same for all servo sectors and may then be followed by encoded Gray data 230. The Gray data 230 is followed by one or more burst demodulation fields 240. The burst demodulation fields 240 are followed by an RRO data field 300, as discussed further below in conjunction with FIG. 3. The SAM 220 comprises some fixed number of bits. The Gray data 230 represents the track number/cylinder information and serves as a coarse positioning for the magnetic recording head. The burst demodulation field(s) 240 serves as a fine positioning system for the head to be on track. The RRO data field 300 provides head positioning information that is finer than that provided by the Gray data 230 and more coarse than that provided by the burst demodulation field(s) 240.

Figure 3:
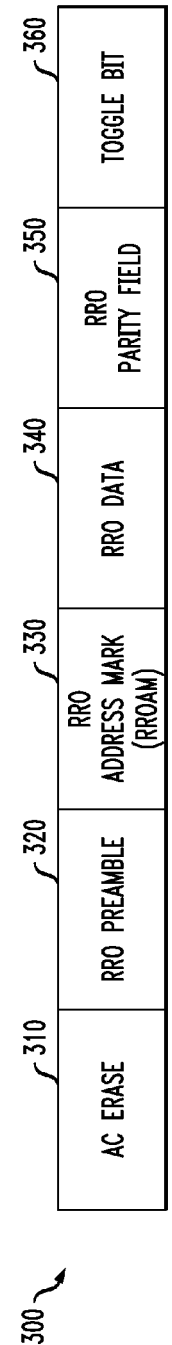
FIG. 3 illustrates a format for the RRO data field of FIG. 2.

FIG. 3 illustrates a format of the RRO data field 300. As shown in FIG. 3. The RRO data field 300 begins with an AC erase 310, which is typically a Nyquist pattern. The AC erase 310 is followed by an RRO Preamble 320 and the RRO address mark (RROAM) 330. The RROAM 330 is a bit pattern that is generally the same for all servo sectors. The RROAM 330 indicates when to start decoding RRO data and aids selection of the best sampling phase for decoding RRO data 340. RROAM 330 is followed RRO data 340, which includes head-positioning information. RRO data 340 is followed by an RRO parity field 350, which includes parity bits employed for error detection/correction. RRO parity field 350 is followed by a toggle bit 360, which brings the magnetization level to whatever the disk used in AC erase 310, in a known manner.

As previously indicated, the RROAM 330 can be any programmable pattern, such as a pattern of 01. The RROAM 330 is typically encoded using wide bi-phase encoding. Thus, a binary zero is encoded as "1100" and a binary one is encoded as "0011." If the RRO data field is not present in the servo sector, an AC erase pattern is typically written instead. If there is an error in the detected AC erase pattern due to noise, the AC erase pattern may be improperly detected as an RRO address mark.

Figure 4:
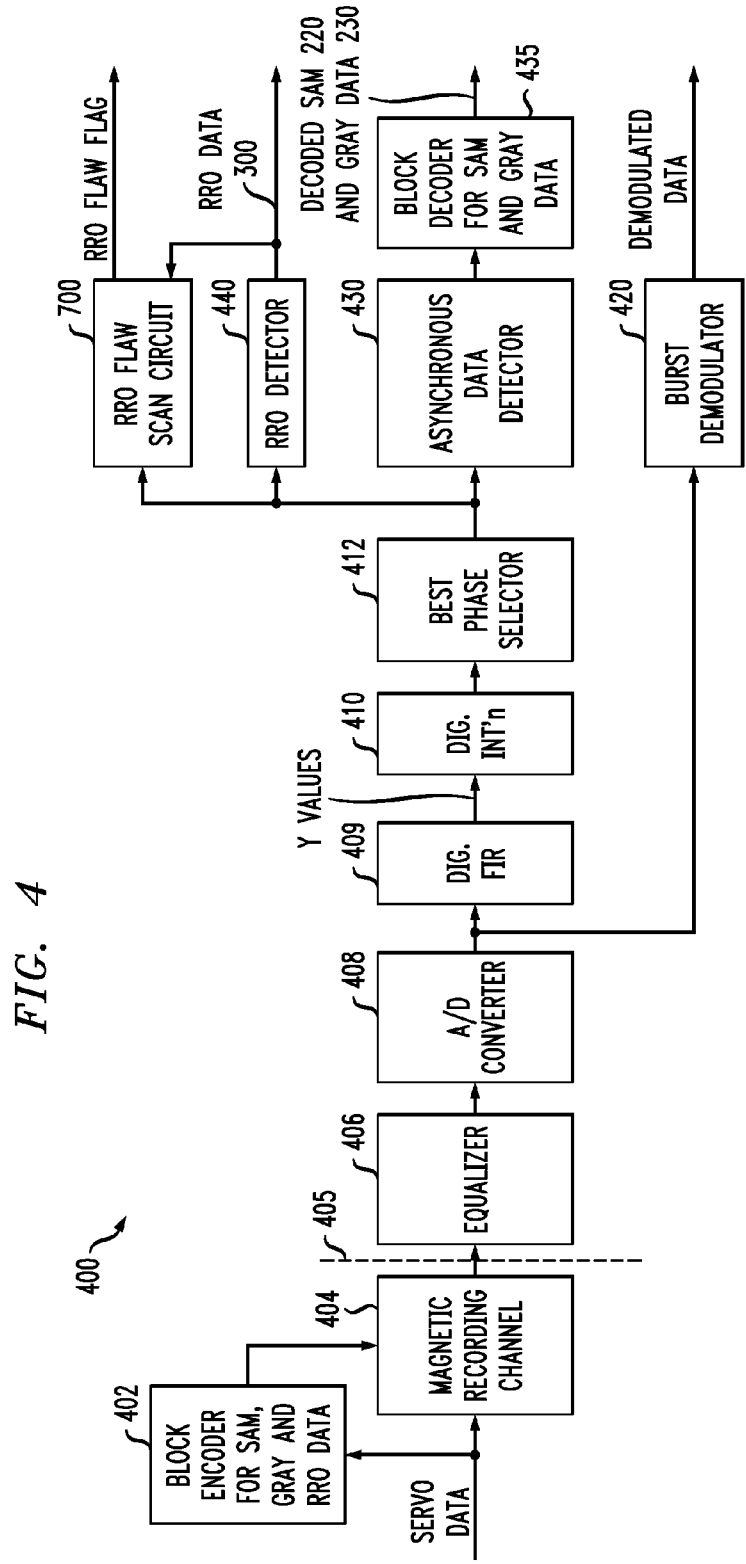
FIG. 4 is a block diagram illustrating a magnetic recording system in which embodiments of the present invention can be implemented.

FIG. 4 is a block diagram illustrating a magnetic recording system 400 in which embodiments of the present invention can be implemented. It is to be understood that the system 400 depicted in FIG. 4 is intended to illustrate the principles of the invention described herein. Portions of the magnetic recording system 400 may be implemented, for example, based on the teachings of U.S. Pat. No. 7,082,005, incorporated by reference herein.

As shown in FIG. 4, the magnetic recording system 400 comprises a servo data block encoder 402, a magnetic recording channel 404, an equalizer 406, for example, with a continuous time filter (CTF) (not shown), an analog-to-digital (A/D) converter 408, a digital FIR filter 409, digital interpolators 410, a best phase selector 412, a burst demodulator 420, an asynchronous data detector 430, a servo data block decoder 435, and an RRO detector 440. It is assumed that the servo data has the same format as shown and described in conjunction with FIGS. 2 and 3.

During a write operation, servo data 200 (FIG. 2) is encoded by the block encoder 402 and written to a magnetic medium such as a disk (denoted as 405) via the magnetic recording channel 404, in a known manner. Encoding by the block encoder 402 may be in accordance with any suitable encoding technique. Portions of the servo data 200 that are not encoded may also be written to the medium 405. Again, it is understood that a magnetic write head, while not expressly shown, is functionally interposed between the magnetic recording channel 404 and the magnetic medium 405 for writing data to the medium.

During a read operation, the servo data 200 (FIG. 2) is read from the magnetic medium 405 via a magnetic read head (not expressly shown but understood to be functionally interposed between the medium 405 and the equalizer 406) and then equalized by the equalizer 406. More specifically, a servo waveform corresponding to an encoded servo pattern is read back from the magnetic medium 405 and equalized, for example, by the CTF within the equalizer 406, in a known manner.

The waveform is then digitized by the A/D converter 408, as is also known. The input to the A/D converter 408 is typically a T symbol rate sampled target response equalized analog signal. It is to be understood that the techniques of the invention may be employed regardless of whether these T rate samples are asynchronously sampled or synchronously sampled with a conventional timing loop. As shown in FIG. 4, the digital values from the A/D converter 408 are processed by the burst demodulator 420 to fine position the magnetic read head over a given track of the magnetic medium 405, in a known manner.

The digital values at the output of the A/D converter 408 are also processed by a digital FIR filter 409 to generate symbol rate equalized A/D converter samples, referred to as 'Y' values, in a known manner. The 'Y' values are then interpolated using the digital interpolators 410 to generate interpolated values. The interpolated 'Y' values output by the digital interpolators 410 are then processed by a best phase selector 412. The best phase selector 412 selects a best phase of the combined stream of asynchronous sample values and interpolated 'Y' values. The best phase selector 412 may be implemented, for example, based on the teachings of United States Published Patent Application No. 2006/0233286, incorporated by reference herein. Generally, the best phase selector 412 employs a peak detection process to adjust a current best phase for sample selection.

The output of the best phase selector 412 is applied in parallel to an asynchronous data detector 430, an RRO detector 440 and an RRO flaw scan circuit 700, as discussed further below in conjunction with FIG. 7. The asynchronous data detector 430 detects the servo data and the block decoder 435 then decodes the detected data in accordance with the encoding technique implemented by the block encoder 402.

The RRO detector 440 processes the interpolated 'Y' values from the best phase selector 412 which represent asynchronous sample values having an arbitrary phase for the RRO data field 300. The RRO detector 440 detects the RRO data field 300, in a known manner. Thus, an embodiment of the present invention operates in parallel to the RRO detector 440. In addition, the present invention does not require additional information to be written on the magnetic medium, relative to conventional techniques.

For a more detailed discussion of the magnetic recording system 400 of FIG. 4, see U.S. patent application Ser. No. 13/281,923, filed Oct. 26, 2011, entitled "Methods and Apparatus for Validating Detection of RRO Address Marks," incorporated by reference herein.

Figure 5:
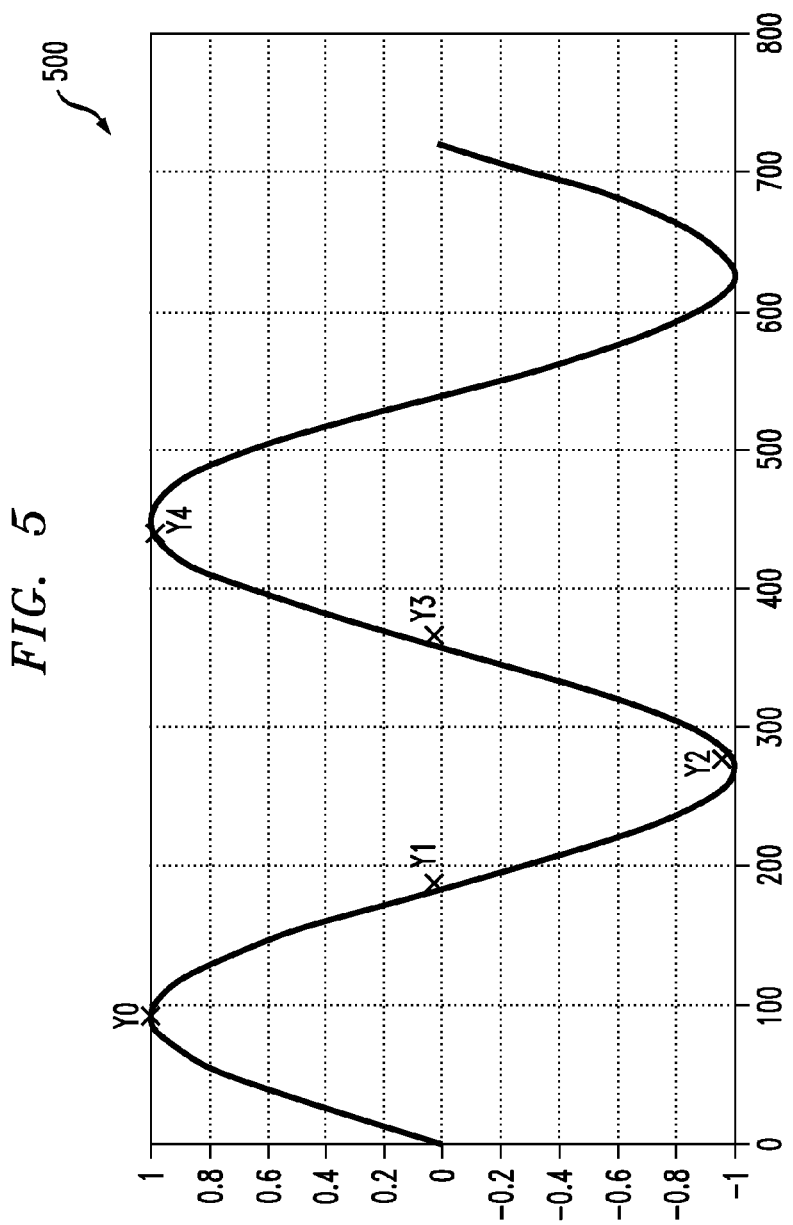
FIG. 5 illustrates a waveform comprising asynchronous sample points and interpolated sample points.

FIG. 5 illustrates a waveform including a peak sample point Y4 and three previous corresponding samples, Y3, Y2 and Y1 that are processed by the magnetic recording system 400 of FIG. 4. As indicated above, the best phase selector 412 selects a best phase of the combined stream of asynchronous sample values and interpolated 'Y' values. The absolute value of the sampled amplitude at the best phase is referred to as a peak sample, such as peak samples Y0 and Y4.

Figure 6:
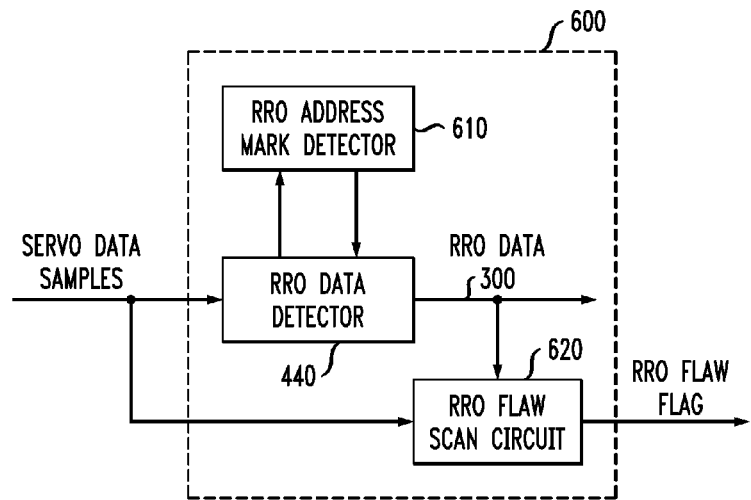
FIG. 6 is a block diagram illustrating an embodiment of a flaw scan system.

FIG. 6 is a block diagram illustrating a flaw scan system 600. As shown in FIG. 6, the flaw scan system 600 comprises an RRO address mark (RROAM) detector 610, the RRO detector 440 of FIG. 4 and an RRO flaw scan circuit 620. The RROAM detector 610 detects the RROAM 330 (FIG. 3) in a known mariner, and can be implemented, for example, using similar techniques as the asynchronous data detector 430 uses to detect the Servo Address Mark 220.

The RRO flaw scan circuit 620 counts the number of low quality samples after the RROAM detector 610 detects the RROAM 330. In addition, the RRO flaw scan circuit 620 will set an RRO flaw flag when the counted number of low quality samples exceeds a specified threshold. Generally, the RRO flaw scan circuit 620 compares the samples at the output of the best phase selector 412 used for data detection to a quality threshold to determine the quality of the samples. Samples that are below the quality threshold are labeled as low quality samples. For example, the output of the best phase selector 412 can have an exemplary range of −128 to +127, and the quality threshold can be any amplitude below, for example, 40. If the number of low quality samples exceeds the specified flaw threshold, N, then the RRO flaw flag is set. In one embodiment, N is equal to 4.

Figure 7:
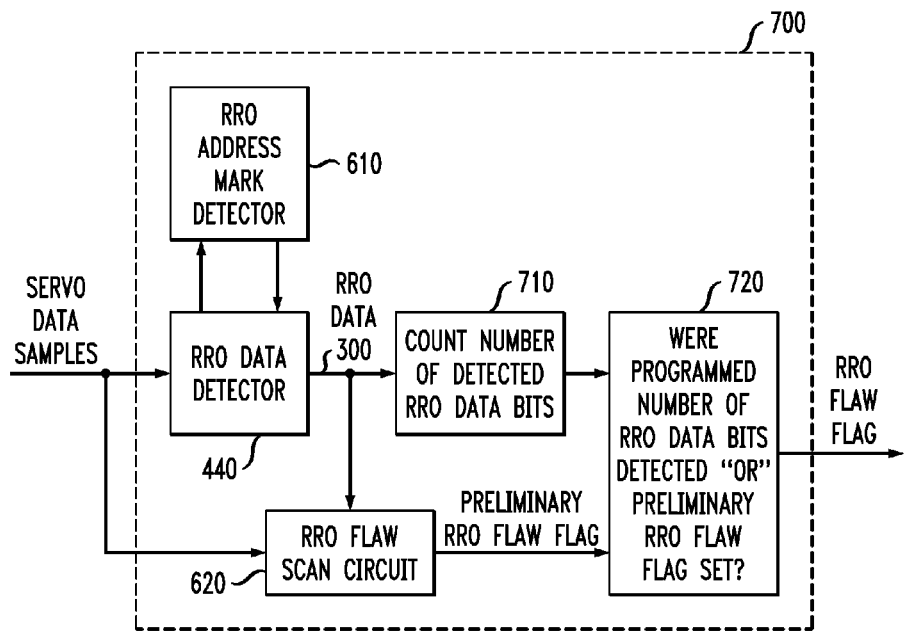
FIG. 7 is a block diagram illustrating a flaw scan system according to one embodiment of the present invention.

FIG. 7 is a block diagram illustrating a flaw scan system 700 according to one embodiment of the present invention. As previously indicated, embodiments of the invention provide improved flaw scan circuits for setting a flaw flag indicating poor quality of the RRO data. Embodiments of the present invention recognize that the number of expected RRO data bits is known. Thus, according to one embodiment of the invention, the disclosed flaw scan system 700 uses the expected number of RRO data bits to set the RRO flaw flag if an expected number of RRO data bits is not recovered by the servo channel, even if the number of low quality samples does not exceed the specified flaw threshold.

As shown in FIG. 7, the flaw scan system 700 comprises the RROAM detector 610, the RRO detector 440 of FIG. 4 and an RRO flaw scan circuit 620, that all operate in a similar manner to FIG. 6. The RRO flaw scan circuit 620 sets a preliminary RRO flaw flag when the counted number of low quality samples exceeds the specified threshold, as discussed above in conjunction with FIG. 6.

In addition, in accordance with embodiments of the present invention, the flaw scan system 700 further comprises a counter 710 and decision circuitry 720. The counter 710 counts the number of RRO data bits in field 340 (FIG. 3). The decision circuitry 720 determines whether (i) the correct number of RRO data bits in field 340 was not detected by the counter 710, or (ii) the preliminary RRO flaw flag was set by the RRO flaw scan circuit 620. The decision circuitry 720 sets the RRO flaw flag if one of these conditions is satisfied.

As previously indicated, the RRO address mark can be missed, for example, in the presence of noise, and a false RRO address mark pattern can be later detected, for example, due to additional noise. The detection of the RRO address mark by the RROAM detector 610 triggers the counting of the number of low quality samples. Thus, if the RROAM is not properly detected, the flaw scan circuit 610 may not properly count the low quality samples. For example, if the false the RRO address mark is found towards the end of a servo processing gate, an insufficient number of low quality samples will be captured to set the flag.

Embodiments of the present invention recognize that the number of expected RRO data bits is known. For example, the hard disk controller can provide the expected number of RRO data bits in field 340 to the servo channel. Thus, according to one embodiment of the invention, the decision circuitry 720 within the flaw scan system 700 uses the expected number of RRO data bits in field 340 to set the RRO flaw flag if the expected number of RRO data bits is not recovered by the servo channel, even if the number of low quality samples does not exceed the specified flaw threshold.

If the RRO flaw flag is set, the RRO data may be discarded, and an error recovery mechanism may be implemented to obtain the RRO data, such as re-reading the same sector to recover the RRO data.

As previously indicated, the arrangements of magnetic recording systems and read channels, as described herein, provide a number of advantages relative to conventional arrangements. Again, it should be emphasized that the above-described embodiments of the invention are intended to be illustrative only. In general, the exemplary magnetic recording systems can be modified, as would be apparent to a person of ordinary skill in the art, to incorporate improved flaw scan circuits in accordance with embodiments of the present invention. In addition, the disclosed RRO address mark processing techniques can be employed in any magnetic recording system. A flaw scan circuit has been presented for setting an RRO flaw flag when the quality of the RRO data is poor. Alternative flaw scan circuits can be established, as would be readily apparent to a person of ordinary skill in the art based on the disclosure herein.

While embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, application specific integrated circuit, micro-controller, or general-purpose computer. Such hardware and software may be embodied within circuits implemented within an integrated circuit.

In an integrated circuit embodiment of the invention, multiple integrated circuit dies are typically formed in a repeated pattern on a surface of a wafer. Each such die may include a device as described herein, and may include other structures or circuits. The dies are cut or diced from the wafer, then packaged as integrated circuits. One skilled in the art would know how to dice wafers and package dies to produce packaged integrated circuits. Integrated circuits so manufactured are considered part of this invention.

Thus, the functions of embodiments of the present invention can be embodied in the form of methods and apparatuses for practicing those methods. One or more embodiments of the present invention can be in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits. The embodiments can also be implemented in one or more of an integrated circuit, a digital signal processor, a microprocessor, and a micro-controller.

It is to be understood that the embodiments and variations shown and described herein are merely illustrative of the principles of this invention and that various modifications may be implemented by those skilled in the art without departing from the scope and spirit of the invention.

I claim:

1. A method, comprising:
   receiving a servo sector including a servo address mark and an RRO (repeatable run out) data field, wherein said RRO data field includes an RRO address mark;
   counting a number of RRO data bits detected in said servo sector after said RRO address mark is detected; and
   setting an RRO flaw flag if at least a specified number of said RRO data bits is not detected in said servo sector.

2. The method of claim 1, further comprising the step of detecting said RRO address mark in said servo sector.

3. The method of claim 2, further comprising the step of counting a number of samples in said servo sector after said RRO address mark that do not satisfy a quality threshold.

4. The method of claim 2, further comprising the step of setting said RRO flaw flag when the counted number of samples that do not satisfy said quality threshold exceeds a specified flaw threshold.

5. The method of claim 2, wherein said RRO address mark is detected by an RRO address mark detector.

6. The method of claim 1, further comprising the step of discarding said RRO data if said RRO flaw flag is set.

7. The method of claim 1, further comprising the step of implementing an error recovery mechanism to obtain said RRO data if said RRO flaw flag is set.

8. The method of claim 1, wherein said RRO flaw flag indicates a poor quality of said RRO data 9. An apparatus, comprising:
   a memory; and
   at least one hardware device, coupled to the memory, operative to:
      receive a servo sector including a servo address mark and an RRO (repeatable run out) data field, wherein said RRO data field includes an RRO address mark:
      count a number of RRO data bits detected in said servo sector after said RRO address mark is detected; and
      set an RRO flaw flag if at least a specified number of said RRO data bits is not detected in said servo sector.

10. The apparatus of claim 9, wherein said at least one hardware device is further configured to detect said RRO address mark in said servo sector.

11. The apparatus of claim 10, wherein said at least one hardware device is further configured to count a number of samples in said servo sector after said RRO address mark that do not satisfy a quality threshold.

12. The apparatus of claim 10, wherein said at least one hardware device is further configured to set said RRO flaw flag when the counted number of samples that do not satisfy said quality threshold exceeds a specified flaw threshold.

13. The apparatus of claim 9, wherein said at least one hardware device is further configured to discard said RRO data if said RRO flaw flag is set.

14. The apparatus of claim 9, further comprising an error recovery mechanism to obtain said RRO data if said RRO flaw flag is set.

15. An RRO (repeatable run out) flaw scan system, comprising:
   a processing circuit operable to receive a servo sector including a servo address mark and an RRO data field, wherein said RRO data field includes an RRO address mark, wherein the processing circuit includes:
      a counter for counting a number of RRO data bits detected in said servo sector after said RRO address mark is detected; and
      decision circuitry for setting an RRO flaw flag if at least a specified number of said RRO data bits is not detected by the counter.

16. The RRO flaw scan system of claim 15, further comprising an RRO address mark detector to detect said RRO address mark.

17. The RRO flaw scan system of claim 16, wherein said counter is further configured to count a number of samples in said servo sector after said RRO address mark that do not satisfy a quality threshold.

18. The RRO flaw scan system of claim 16, wherein said decision circuitry is further configured to set said RRO flaw flag when the counted number of samples that do not satisfy said quality threshold exceeds a specified flaw threshold.

19. The RRO flaw scan system of claim 15, further comprising means for discarding said RRO data if said RRO flaw flag is set.

20. The RRO flaw scan system of claim 15, further comprising an error recovery mechanism to obtain said RRO data if said RRO flaw flag is set.

* * * * *